United States Patent

Burns et al.

[11] Patent Number: 5,942,590
[45] Date of Patent: Aug. 24, 1999

[54] PROCESS FOR MAKING HYDROPHOBIC SILICA WITH REDUCED SURFACE AREA UNDER NEUTRAL CONDITIONS

[75] Inventors: Gary Thomas Burns, Ohain, Belgium; Qin Deng, Midland, Mich.; James Richard Hahn, Midland, Mich.; Clifford Carlton Reese, Midland, Mich.

[73] Assignee: Dow Corning Corporation, Midland, Mich.

[21] Appl. No.: 09/022,282

[22] Filed: Feb. 11, 1998

Related U.S. Application Data

[63] Continuation-in-part of application No. 08/806,002, Feb. 24, 1997, abandoned.

[51] Int. Cl.⁶ .................................................... C08G 77/00
[52] U.S. Cl. ............................. 528/10; 423/338; 528/30; 528/32; 528/490
[58] Field of Search ............................. 423/338; 528/10, 528/30, 32, 490

[56] References Cited

U.S. PATENT DOCUMENTS 4,595,578  6/1986  Cohen et al. ............................ 423/338
5,708,069  1/1998  Burns et al. ............................ 528/10

*Primary Examiner*—Melvyn I. Marquis
*Attorney, Agent, or Firm*—Wiliam F. Boley

[57] ABSTRACT

The present invention is hydrophobic silica gels having a reduced surface area and a method for their preparation under neutral conditions. The method comprises two steps, where in the first step the pH of a mixture comprising a silica hydrosol and colloidal silica is adjusted with a base to within a range of pH 3 to pH 6 to facilitate formation of a silica hydrogel having incorporated therein colloidal silica. In the second step the silica hydrogel is contacted with an organosilicon compound in the presence of a catalytic amount of a strong acid to effect hydrophobing of the silica hydrogel to form a hydrophobic silica gel having a surface area within a range of about 100 $m^2/g$ to 450 $m^2/g$ in the dry state. In a preferred process the hydrophobic silica gel is contacted with a sufficient quantity of a water-immiscible organic solvent to convert the hydrophobic silica hydrogel into a hydrophobic silica organogel. A water soluble compound of cerium or iron may be added during conduct of the second step to improve heat stability of the hydrophobic silica gel.

26 Claims, No Drawings

PROCESS FOR MAKING HYDROPHOBIC SILICA WITH REDUCED SURFACE AREA UNDER NEUTRAL CONDITIONS

This application is a CIP of Ser. No. 08/806,002 filed Feb. 24, 1997 now abandoned.

BACKGROUND OF INVENTION

The present invention is hydrophobic silica gels having reduced surface area and a method for their preparation under neutral conditions. The method comprises two steps, where in the first step the pH of a mixture comprising a silica hydrosol and a colloidal silica is adjusted with a base to within a range of about pH 3 to pH 7 to form a silica hydrogel having incorporated therein colloidal silica. In the second step the silica hydrogel is contacted with an organosilicon compound in the presence of a catalytic amount of a strong acid to effect hydrophobing of the silica hydrogel to form a hydrophobic silica gel having a surface area within a range of about 100 $m^2/g$ to 450 $m^2/g$ in the dry state. In a preferred method the hydrophobic silica hydrogel is contacted with a sufficient quantity of a water-immiscible organic solvent to convert the hydrophobic silica hydrogel into a hydrophobic silica organogel. The water-immiscible organic solvent can then be removed from the silica organogel to form a hydrophobic silica gel having a surface area within a range of about 100 $m^2/g$ to 450 $m^2/g$ in the dry state. A water soluble compound of cerium or iron may be added during conduct of the second step to improve the heat stability of the hydrophobic silica gel.

Although hydrophobic silica gels prepared by the present method are useful in many applications such as thermal insulating, reinforcing and extending filler in natural rubbers, and as filler in floatation devices, they are particularly useful as reinforcing fillers in silicone rubber compositions. It is well known that silicone rubber formed from the vulcanization of polydiorganosiloxane fluids or gums alone generally have low elongation and tensile strength values. One means for improving the physical properties of such silicone rubber involves the incorporation of a reinforcing silica filler into the fluid or gum prior to curing. However, silica reinforcing fillers have a tendency to interact with the polydiorganosiloxane fluid or gum causing a phenomenon typically referred to as "crepe hardening." A great deal of effort has been made in the past to treat the surface of reinforcing silica fillers with organosilanes or organosiloxanes to make the surface of the silica hydrophobic. This surface treatment reduces or diminishes the tendency of the compositions to crepe harden and improves the physical properties of the cured silicone rubber.

Brown, U.S. Pat. No. 3,024,126, teaches a method for making a pre-formed reinforcing silica filler hydrophobic by treating it in an organic solvent with an organosilicon compound, such as an organosilane or low-molecular weight organosiloxane containing 0.1 to 2 total hydroxyl and/or alkoxy radicals per silicon atom, and a small amount of amine, quaternary ammonium, or organometallic compound.

Lewis, U.S. Pat. No. 3,979,546, teaches a method for making the surface of reinforcing silica fillers hydrophobic through the use of alpha-alkoxy-omega-siloxanols with alcohols under mild conditions. The fillers taught are pre-formed solids.

Tyler, U.S. Pat. No. 3,015,645, teaches the making of hydrophobic silica powders by reacting an organosilicon compound such as dimethyldichlorosilane or trimethylmethoxysilane with a silica organogel in the presence of an acidic catalyst and then removing the volatile materials. The method requires the preparation of a silica hydrogel which is converted to a silica organogel by replacing the water in the silica hydrogel with an organic solvent.

Lentz, U.S. Pat. No. 3,122,520, teaches a procedure where an acidic silica hydrosol is first heated to develop a reinforcing silica structure and then mixed with an organosilicon compound, an acid catalyst, and a water-immiscible organic solvent to produce a hydrophobic silica filler. The organosilicon compounds taught by Lentz are limited to those compounds in which the organic radicals bonded to silicon atoms have less than 6 carbon atoms, organosilicon compounds having no organofunctional substituents bonded to silicon atoms, and to organosilicon compounds having no hydrogen bonded to silicon atoms.

Alexander et al., U.S. Pat. No. 2,892,797, describe silica sols modified by treatment with a solution of a metalate so that the silica particles are coated with no more than a molecular layer of a combined metal which forms an insoluble silicate at a pH between 5 and 12. Aluminum, tin, zinc, and lead are taught as the preferred metals. Alexander et al. teach that silica sols which carry a metal upon the surface of the particles according to their invention have increased stability at pH extremes.

Termin et al., U.S. Pat. No. 3,850,971, and Termin et al. U.S. Pat. No. 4,006,175 teach that porous silicic acid having a specific surface area of about 50 $m^2/g$ to 1000 $m^2/g$ can be made by hydrolyzing methyl or ethyl silicate or polymethyl or polyethyl silicate with about 70 to 120% of the stoichiometric amount of water with moderate stirring. Termin et al. teach that transition metals such as iron oxides and chromium oxides may be used as hydrolysis activators and that such metals may appear in the end product.

Nauroth et al., U.S. Pat. No. 4,360,388, teach cerium containing precipitated silica. Nauroth et al. teach that silicone rubber compositions reinforced with the cerium containing precipitated silica exhibit excellent heat stability and that the cerium containing precipitated silica acts as a fire retardant agent.

Nauroth et al., U.S. Pat. No. 4,208,316, teach the use of hydrophobic precipitated silica as a reinforcing filler in plastic masses which are hardenable to form elastomers. Such elastomers include silicone elastomers.

Jansen et al., EP 0-690-023 A2, teach the formation of silica gels by adding base to an aqueous waterglass solution and aging of the silica gels at a pH of 4 to 11 prior to a hydrophobing step. The described gels do not contain colloidal silica.

Jensen et al., EP 0-658,513 A1, teach the formation of silica gels by adding base to an aqueous waterglass solution and aging of the silica gels at a pH of 6 to 11 prior to a hydrophobing step. The described gels do not contain colloidal silica.

The neutral conditions of the present method for preparing the colloidal silica-containing hydrogels provide advantages over a process where the silica hydrogel is prepared under strong acid conditions. The advantages include reduced use of acid in the process, the ability to use less acid resistant process equipment, and faster conversion of the colloidal silica-containing silica hydrosol into the corresponding silica hydrogel.

SUMMARY OF INVENTION

The present invention is hydrophobic silica gels having a reduced surface area and a method for their preparation under neutral conditions. The method comprises two steps, where in the first step the pH of a mixture comprising a silica hydrosol and colloidal silica is adjusted with a base to within a range of pH 3 to pH 6 to facilitate formation of a silica hydrogel having incorporated therein colloidal silica. In the second step the silica hydrogel is contacted with an organosilicon compound in the presence of a catalytic amount of a strong acid to effect hydrophobing of the silica hydrogel to form a hydrophobic silica gel having a surface area within a range of about 100 $m^2/g$ to 450 $m^2/g$ in the dry state. In a preferred process the hydrophobic silica gel is contacted with a sufficient quantity of a water-immiscible organic solvent to convert the hydrophobic silica hydrogel into a hydrophobic silica organogel. The organic solvent can be removed from the hydrophobic silica organogel to form a hydrophobic silica gel having a surface area within a range of about 100 $m^2/g$ to 450 $m^2/g$ in the dry state. A water soluble compound of cerium or iron may be added during conduct of the second step to improve heat stability of the hydrophobic silica gel.

DESCRIPTION OF INVENTION

The present invention is hydrophobic silica gels having reduced surface area and a method for their preparation under neutral conditions. The method for preparing the hydrophobic silica gels comprises:

(A) adjusting the pH of a mixture comprising (i) a silica hydrosol comprising about 0.02 g to 0.5 g of $SiO_2$ per milliliter and having an average particle size less than 4 nm and (ii) about 0.1 to 50 weight percent of colloidal silica having an average particle size of at least 4 nm with a base to within a range of about pH 3 to pH 7 at a temperature within a range of about 10° C. to 250° C. to form a silica hydrogel having the colloidal silica incorporated therein, and (B) mixing the silica hydrogel with (1) a catalytic amount of a strong acid and (2) an organosilicon compound selected from the group consisting of organosilanes described by formula

$$R^1_a H_b SiX_{4-a-b} \qquad (1)$$

and organosiloxanes described by formula

$$R^1_n SiO_{(4-n)/2}, \qquad (2)$$

where each $R^1$ is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising about 1 to 12 carbon atoms, a=0, 1, 2, or 3, b=0 or 1, a+b=1, 2, or 3 with the proviso that when b=1 then a+b=2 or 3, and n is an integer of from 2 to 3 inclusive to form a hydrophobic silica hydrogel having a surface area within a range of about 100 $m^2/g$ to 450 $m^2/g$ as measured in the dry state.

The method of the present invention is a two step procedure, comprising steps (A) and (B), for making hydrophobic silica gels having colloidal silica incorporated therein. Step (A) of the method comprises adjusting the pH of a mixture comprising a silica hydrosol and colloidal silica with a base to within a range of about pH 3 to pH 7 to form a silica hydrogel having the colloidal silica incorporated therein. Step (B) comprises mixing the silica hydrogel prepared in step (A) with an organosilicon compound which reacts with the silica hydrogel to give a hydrophobic silica hydrogel. In a preferred method the hydrophobic silica hydrogel is contacted with sufficient water-immiscible organic solvent to convert the hydrophobic silica hydrogel to a hydrophobic silica organogel. The water-immiscible organic solvent can then be removed from the hydrophobic silica organogel to form a hydrophobic silica gel.

The method used to prepare the silica hydrosol is not critical and can be any of those known in the art. As used herein the term "silica hydrosol" means those hydrosols of silica having an average particle size less than 4 nanometers (nm). Silica hydrosols useful in the present method can be prepared by, for example, deionizing sodium silicate by a method such as the use of an ion exchange resin. The silica hydrosol may be prepared by hydrolyzing a silane at a low temperature. The silica hydrosol may be prepared by acidifying a sodium silicate mixture.

In the present method, the silica hydrosol must provide about 0.02 g to 0.5 g of $SiO_2$ per ml of the mixture. Preferably, the silica hydrosol provides about 0.05 g to 0.2 g of $SiO_2$ per ml of the mixture.

The mixture of the present method requires the presence of about 0.1 to 50 weight percent of colloidal silica, based on the total weight of the mixture. As used herein the term "colloidal silica" means those hydrosols of silica having an average particle size of at least 4 nm. Preferred is when the mixture comprises about 10 to 30 weight percent of colloidal silica, based on the total weight of the mixture. Generally, the colloidal silica useful in the present method and compositions can be described as a colloidal amorphous silica that has not at any point existed as gel during its preparation. The method of preparation of the colloidal silica is not critical to the present method and compositions and can be any of those known in the art. The colloidal silica can be prepared by, for example, combining an aqueous solution of a soluble metal silicate, such as sodium silicate, and an acid so that the colloidal particles grow in a weakly alkaline solution until the desired particle size is achieved. Preferred is a colloidal silica having a particle size within a range of 4 to about 300 nm. Even more preferred is a colloidal silica having an average particle size within a range of about 6 to 100 nm.

In step (A), the pH of the mixture comprising the silica hydrosol and the colloidal silica is adjusted to within a range of about pH 3 to pH 7 by addition of a base to facilitate formation of a silica hydrogel. Preferably, the pH of the silica hydrosol is adjusted by means of a base to within a range of about pH 3.5 to pH 6. The base can be, for example, an inorganic base such as $NH_4OH$, $NaOH$, $KOH$, and $Na_2O(SiO_2)_{3.36}$.

The temperature at which step (A) is conducted can be within a range of about 10° C. to 250° C. Preferred is when step (A) is conducted at a temperature within a range of about 75° C. to 150° C. Even more preferred is when step (A) is conducted at a temperature within a range of about 90° C. to 110° C.

In step (A), the length of time required for the silica hydrosol to convert to the corresponding colloidal silica-containing silica hydrogel varies with the temperature and pH. Generally, the higher the temperature and the higher the pH the shorter the contact time needed. Step (A) must be continued until the silica hydrogel having the colloidal silica incorporated therein acquires a structure such that the final product after hydrophobing has a surface area in the dry state within a range of about 100 $m^2/g$ to 450 $m^2/g$ as determined by the Brunauer Emmett and Teller (BET) method described in the Jour. Am. Chem. Soc. 60:309 (1938) and as further described in Lentz, U.S. Pat. No. 3,122,520, which is hereby incorporated by reference for such a teaching.

The surface area of the silica hydrogel at the conclusion of step (A) is immaterial provided it is such that the surface area of the dried product after the hydrophobing of step (B) is within the above described range. Generally the surface area of the silica hydrogel is reduced by the hydrophobing reaction, since the organosilyl groups which become attached to the surface of the silica hydrogel increase the average particle size. The surface of the silica hydrogel can be above 450 m$^2$/g provided that the hydrophobing treatment brings it within a range of about 100 m$^2$/g to 450 m$^2$/g.

To determine the proper conditions for conduct of step (A) it is necessary to proceed with the hydrophobing of step (B) and then measure the surface area of the resulting product in the dry state. If the surface area of the hydrophobic silica gel in the dry state is above 450 m$^2$/g, then the conditions of step (A) were too mild. If the surface area of the hydrophobic silica gel in the dry state is below 100 m$^2$/g, then the conditions of step (A) were too severe. Examples of suitable pH, temperatures, and times for conduct of step (A) are provided in the Examples herein. If the surface area of the hydrophobic silica gel in the dry state is above or below the described range, the hydrophobic silica gels have diminished reinforcing properties in silicone elastomers.

In an alternative embodiment of the present method, the silica hydrogel of step (A) can be aged at a pH within a range of about pH 3.5 to pH 8. Preferred is when the silica hydrogel is aged at a pH within a range of about pH 6 to pH 7.5. If necessary, the pH of the silica hydrogel can be adjusted for aging to within the described ranges by use of a base such as previously described for use in step (A). Generally, the silica hydrogel can be aged at a temperature within a range of about 0° C. to 250° C. It is preferred that the silica hydrogel be aged at a temperature within a range of about 20° C. to 150° C. Most preferred is when the silica hydrogel is aged at a temperature within a range of about 80° C. to 130° C. The length of time for aging the silica hydrogel can be from about 10 minutes to 76 hours or longer. A preferred length of time for aging the silica hydrogel is within a range of about 1 to 24 hours.

If desired, the silica hydrogel of step (A) may be subjected to a shearing force to reduce aggregate particle size and create a more uniform particle size distribution prior to the conduct of the hydrophobing reaction of step (B). If shearing is conducted, it is preferred that shearing of the silica hydrogel be performed after any aging of the silica hydrogel. The shearing force may be applied to the silica hydrogel by any of those methods known in the art. The shearing force may be applied, for example, by a mechanical means such as a high-speed mixer or by ultrasound. This reduction in aggregate particle size and improved uniformity of particle size can provide for hydrophobic silica gels which when compounded into silicone elastomer compositions provide for lower viscosity compositions, more stable compositions, and for cured silicone elastomers having improved clarity and physical properties.

In step (B) of the present method the silica hydrogel of step (A) is mixed with one or more of the defined organosilicon compounds described by formulas (1) and (2) in the presence of a catalytic amount of a strong acid to effect hydrophobing of the silica hydrogel. The catalytic amount of strong acid can be added either prior to, simultaneously with, or subsequent to the addition of the organosilicon compound. In the case where the organosilicon compound is, for example, a chlorosilane, the catalytic amount of the strong acid can be generated in situ by hydrolysis of the chlorosilane or the reaction of the chlorosilane directly with hydroxyls of the silica hydrogel. By the term "catalytic amount" it is meant that the strong acid is present in an amount sufficient to effect reaction of the organosilicon compound with the silica hydrogel. Examples of useful acids include hydrochloric, hydroiodic, nitric, phosphonic, sulfuric, and benzene sulfonic acids. It is preferred that in step (B) the strong acid catalyst provide a pH less than about 2.5.

The temperature at which step (B) is conducted is not critical and can be from about 20° C. to 250° C. Generally it is preferred that step (B) be conducted at a temperature within a range of about 30° C. to 150° C. Step (B) can be conducted at the reflux temperature of the water-immiscible organic solvent when present.

In step (B), the silica hydrogel of step (A) is reacted with an organosilicon compound described by formula (1) or (2). In formulas (1) and (2), each $R^1$ can be independently selected from a group consisting of hydrocarbon radicals comprising about 1 to 12 carbon atoms and organofunctional hydrocarbon radicals comprising about 1 to 12 carbon atoms. $R^1$ can be a saturated or unsaturated hydrocarbon radical. $R^1$ can be a substituted or non-substituted hydrocarbon radical. $R^1$ can be, for example, alkyl radicals such as methyl, ethyl, propyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^1$ can be an organofunctional hydrocarbon radical comprising about 1 to 12 carbon atoms where, for example, the functionality is mercapto, disulfide, polysulfide, amino, carboxylic acid, carbinol, ester, or amido. A preferred organofunctional hydrocarbon radical is one having disulfide or polysulfide functionality.

In formula (1) each X is independently selected from a group consisting of halogen and alkoxy radicals comprising about 1 to 12 carbon atoms. When X is a halogen, it is preferred that the halogen be chlorine. When X is an alkoxy radical, X may be, for example, methoxy, ethoxy, and propoxy. Preferred is where each X is selected from a group consisting of chlorine atoms and methoxy.

The viscosity of the organosiloxanes described by formula (2) is not limiting and can range from that of a fluid to a gum. Generally, higher molecular weight organosiloxanes will be cleaved by the acidic conditions of the present method allowing them to react with the silica hydrogel.

The organosilicon compound may be provided to the present method as a single compound as described by formulas (1) or (2) or as a mixture of two or more organosilicon compounds described by formulas (1) and (2).

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, and bis{3-(triethoxysilyl)propyl}tetrasulfide. When the hydrophobic silica gel is to be used as a filler in silicone rubber, it is preferred that the organosilicon compound be hexamethyldisiloxane or dimethyldichlorosilane.

The amount of organosilicon compound added to the method is that sufficient to adequately hydrophobe the silica hydrogel to provide a hydrophobic silica gel suitable for its intended use. Generally the organosilicon compound should be added to the method in an amount such that there is at least 0.04 organosilyl unit per $SiO_2$ unit in the silica hydrogel, the SiO2 units including both those provided by the silica hydrogel and the colloidal silica. The upper limit of the amount of organosilicon compound added to the process is not critical since any amount in excess of the amount required to saturate the silica gel will act as a solvent for the method.

The hydrophobic silica hydrogel of step (B) may be used as is or may be recovered for use by such methods as centrifugation or filtration. The hydrophobic silica hydrogel may be dried by the use of such methods as heating or reducing pressure or a combination of both heating and reduced pressure.

In a preferred method a water-immiscible organic solvent in sufficient amount to convert the silica hydrogel or hydrophobic silica hydrogel to the corresponding organogel is added to the method. The solvent can be added prior to, simultaneously with, or subsequent to the addition of the organosilicon compound. That is the silica hydrogel can be first converted into an organogel by replacement of the water with the organic solvent and then hydrophobed. Alternatively, the organosilicon compound and the organic solvent can be added simultaneously to the silica hydrogel. Under these conditions the reaction of the silica hydrogel with the organosilicon compound and the replacement of the water in the hydrophobic silica hydrogel with the organic solvent may occur simultaneously. Finally the organosilicon compound can be added prior to the organic solvent, in which case the silica hydrogel reacts with the organosilicon compound and the resulting product is then converted into an organogel by an addition of an organic solvent. In the latter two cases the conversion to an organogel is accomplished by a phase separation, in which the hydrophobic silica organogel passes into the organic solvent phase. A preferred method is where a water-immiscible organic solvent is added after formation of the hydrophobic silica hydrogel thereby effecting formation of a hydrophobic silica organogel.

For purpose of this invention any organic solvent immiscible with water can be employed. Suitable water-immiscible organic solvents include low molecular weight siloxanes such as hexamethyldisiloxane, octamethylcyclotetrasiloxane, diphenyltetramethyldisiloxane and trimethylsilyl endblocked polydimethylsiloxane fluids. When a siloxane is employed as a solvent it may serve both as a solvent and as a reactant with the silica hydrogel. In addition, suitable solvents include aromatic hydrocarbons such as toluene and xylene; heptane and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene, and ketones such as methylisobutylketone.

The amount of solvent is not critical so long as there is sufficient solvent to convert the hydrophobic silica hydrogel into a silica organogel. Preferably the solvent should have a boiling point below about 250° C. to facilitate its removal from the hydrophobic silica organogel, however the boiling point is not critical since the solvent may be removed from the hydrophobic silica organogel by centrifuging or other suitable means.

After the silica hydrogel has been converted to the hydrophobic silica organogel the resulting product may be employed per se. That is the hydrophobic silica organogel may be used directly as a reinforcing agent in silicone rubber or in any other uses for which this type of product can be used. Alternatively, the solvent may be removed from the hydrophobic silica organogel and the resulting dry hydrophobic silica gel used.

During the conduct of step (B) it may be desirable to add a surfactant or water-miscible solvent to facilitate the reaction of the organosilicon compound with the silica hydrogel. The surfactant or water-miscible solvent may be added in the presence or absence of any water-immiscible organic solvent added to the method. Suitable surfactants can include, for example, anionic surfactants such as dodecylbenzene sulfonic acid, nonionic surfactants such as polyoxyethylene (23)lauryl ether and $(Me_3SiO)_2MeSi(CH_2)_3(OCH_2CH_2)_7OMe$ where Me is methyl, and cationic surfactants such as N-alkyltrimethyl ammonium chloride. Suitable water miscible solvents include, for example, alcohols such as ethanol, propanol, isopropanol, and tetrahydrofuran.

In step (B) of the present method an effective amount of a heat stabilizing agent selected from a group consisting of water soluble compounds of cerium and iron may be added. By the term "effective amount" it is meant that the water soluble compound of cerium or iron is present in the hydrophobic silica gel at a concentration sufficient to provide improved heat stability to those compositions in which the hydrophobic silica gel is incorporated. Such compositions can include, for example, silicone rubber, natural rubber, and synthetic organic rubber.

Generally, about 0.01 percent weight/volume (% Wt./Vol.) to 10% Wt./Vol. of the water soluble compound of cerium or iron in relation to the volume of components in step (B), excluding any added water-immiscible organic solvent, is considered useful in the present process. Preferred is where the water soluble compound of cerium or iron comprises about 0.1% Wt./Vol. to 1% Wt./Vol. on the same basis.

Examples of water soluble compounds which may be useful in the present method include $FeCl_3$, $FeBr_2$, $FeBr_3.6H_2O$, $FeCl_2.4H_2O$, $FeI_2.4H_2O$, $Fe(NO_3)_3.6H_2O$, $FePO_4.2H_2O$, $CeCl_3.9H_2O$, $CeBr_3.H_2O$, $CeI_3.9H_2O$, $Ce(NO_3)_3.6H_2O$, and $Ce(SO_4)_2.2H_2O$. A preferred water soluble compound of cerium or iron for use in the present method is selected from the group consisting of $FeCl_3$ and $CeCl_3.9H_2O$.

The following examples are provided to illustrate the present invention. These examples are not intended to limit the scope of the present claims.

EXAMPLE 1

A silica gel having incorporated therein colloidal silica and hydrophobed with dimethyldichlorosilane was prepared at pH 5.5. A silica hydrosol was prepared by adding 700 ml of PQ N Clear Sodium Silicate (PQ Corporation, Valley Forge, Pa.) diluted with 1680 ml of deionized water to a stirred solution comprising 245 ml of concentrated HCl (Fisher Certified, Fisher Scientific, Fair Lawn, N.J.) diluted with 500 ml of deionized water. Immediately after this addition, 359 ml of Ludox® HS colloidal silica (DuPont Chemicals, Wilmington, Del., average particle size 12 nm) diluted with 516 ml of deionized water was added to the solution. The pH of the solution was adjusted to 2.5 by adding diluted PQ N Clear Sodium Silicate. The resulting silica hydrosol had a silica concentration of 0.115 g $SiO_2$/ml, with 40 weight percent of the silica being provided by the colloidal silica. Two liters of the silica hydrosol were transferred to a 5 L flask and adjusted to pH 5.5 by adding diluted PQ N Clear Sodium Silicate solution. The silica hydrosol gelled within a few seconds and was then refluxed with stirring for 2 hours.

To the cooled silica hydrogel, with stirring, was added 666 ml of isopropanol followed by 70 ml of dimethyldichlorosilane. This mixture was heated at 65° C., with stirring, for 0.5 hour. To the mixture was added 1.2 L of toluene with stirring. Stirring was stopped and the aqueous phase drained from the flask. The toluene phase was washed with 1 L of a 25 volume percent solution of isopropanol in deionized water. An additional 800 ml of toluene were added to the flask. The flask was fitted with a Dean-Stark trap and the toluene phase refluxed to remove residual water. The flask content was poured into glass pans and the toluene evaporated leaving as product a hydrophobic silica gel. The hydrophobic silica gel was dried for 14 hours at 150° C. The yield of dried hydrophobic silica gel was 262 g.

EXAMPLE 2

A silica gel having incorporated therein colloidal silica, hydrophobed with hexamethyldisiloxane, and heat stabilized by the addition of $FeCl_3$ was prepared at pH 5.5. A silica hydrosol was prepared by adding 700 ml of PQ N Clear Sodium Silicate (PQ Corporation) diluted with 1680 ml of deionized water to a stirred solution comprising 245 ml of concentrated HCl (Fisher Certified) diluted with 500 ml of deionized water. Immediately after this addition, 359 ml of Ludox HS colloidal silica (DuPont Chemicals) diluted with 516 ml of deionized water was added to the solution. The pH of this solution was adjusted to 2.5 by adding diluted PQ N Clear Sodium Silicate. The resulting silica hydrosol had a silica concentration of 0.115 g $SiO_2$/ml, with 40 weight percent of the silica being provided by the colloidal silica. Two liters of the silica hydrosol were transferred to a 5 L flask and adjusted to pH 5.5 by adding diluted PQ N Clear Sodium Silicate solution. The silica hydrosol gelled within a few seconds and was then refluxed with stirring for 2 hours.

To the cooled silica hydrogel, with stirring, was added 833 ml of isopropanol followed by 100 ml of hexamethyldisiloxane and 3.2 g of $FeCl_3$. This mixture was stirred for 1 hour at room temperature. To the mixture was added 1650 ml of toluene with stirring. Stirring was stopped and the aqueous phase drained from the flask. The toluene phase was washed with 1 L of a 25 volume percent solution of isopropanol in deionized water. An additional 350 ml of toluene were added to the flask. The flask was fitted with a Dean-Stark trap and the toluene phase refluxed to remove residual water. The flask content was poured into glass pans and the toluene evaporated leaving as product a hydrophobic silica gel. The hydrophobic silica gel was dried for 14 hours at 150° C. The yield of dried hydrophobic silica gel was 253 g.

EXAMPLE 3

A silica gel having incorporated therein colloidal silica, hydrophobed with dimethyldichlorosilane and vinylmethyldichlorosilane, and heat stabilized by the addition of $FeCl_3$ was prepared at pH 5.5. A silica hydrosol was prepared by adding 630 ml of PQ N Clear Sodium Silicate (PQ Corporation) diluted with 1512 ml of deionized water to a stirred solution comprising 220 ml of concentrated HCl (Fisher Certified) diluted with 450 ml of deionized water. Immediately after this addition, 688 ml of Ludox®SM colloidal silica (DuPont Chemicals, Wilmington, Del., average particle size 7 nm) diluted with 465 ml of deionized water was added to the solution. The resulting silica hydrosol had a silica concentration of 0.127 g $SiO_2$/ml, with 50 weight percent of the silica being provided by the colloidal silica. Two liters of the silica hydrosol were transferred to a 5 L flask and adjusted to pH 5.4 by adding diluted PQ N Clear Sodium Silicate solution. The silica hydrosol gelled within a few seconds and was then refluxed with stirring for 2 hours.

To the cooled silica hydrosol, with stirring, was added 666 ml of isopropanol, 3.4 g of $FeCl_3$, and a mixture comprising 70 ml of dimethyldichlorosilane and 3.2 ml of vinylmethyldichlorosilane. This mixture was heated at 65° C. with stirring for 0.5 hour. To the mixture was added 1450 ml of toluene with stirring. Stirring was stopped and the aqueous phase drained from the flask. The toluene phase was washed with 1 L of a 25 volume percent solution of isopropanol in deionized water. An additional 550 ml of toluene were added to the flask. The flask was fitted with a Dean-Stark trap and the toluene phase refluxed to remove residual water. The flask content was poured into glass pans and the toluene evaporated leaving as product a hydrophobic silica gel. The hydrophobic silica gel was dried for 8 hours at 80° C. The yield of dried hydrophobic silica gel was 290 g.

EXAMPLE 4

A silica gel having incorporated therein colloidal silica and hydrophobed with dimethyldichlorosilane and bis{3-(triethoxysilyl)propyl}tetrasulfide was prepared at pH 5.4. A silica hydrosol was prepared by adding 630 ml of PQ N Clear Sodium Silicate (PQ Corporation) diluted with 1512 ml of deionized water to a stirred solution consisting of 220 ml of concentrated HCl (Fisher Certified) diluted with 450 ml of deionized water. Immediately after this addition, 688 ml of Ludox SM colloidal silica (DuPont Chemicals) diluted with 465 ml of deionized water was added to the solution. The resulting silica hydrosol had a silica concentration of 0.127 g $SiO_2$/ml, with 50 weight percent of the silica being provided by the colloidal silica. Two liters of the silica hydrosol were transferred to a 5 L flask and adjusted to pH 5.4 by adding diluted PQ N Clear Sodium Silicate solution. The silica hydrosol gelled within a few seconds and was then refluxed with stirring for 2 hours.

To the cooled silica hydrogel, with stirring, was added 666 ml of isopropanol, 10 ml of bis{3-(triethoxysilyl)propyl}tetrasulfide, and 70 ml of dimethyldichlorosilane. This mixture was heated at 65° C., with stirring, for 0.5 hour. To the mixture was added 1.2 L of toluene with stirring. Stirring was stopped and the aqueous phase drained from the flask. The toluene phase was washed with 1 L of a 25 volume percent solution of isopropanol in deionized water. An additional 800 ml of toluene were added to the flask. The flask was fitted with a Dean-Stark trap and the toluene phase refluxed to remove residual water. The flask content was poured into glass pans and the toluene evaporated leaving as product a hydrophobic silica gel. The hydrophobic silica gel was dried for 8 hours at 80° C. The yield of dried hydrophobic silica gel was 293 g.

We claim:
1. A method for preparing a hydrophobic silica gel comprising: (A) adjusting the pH of a mixture comprising (i) a silica hydrosol comprising about 0.02 g to 0.5 g of $SiO_2$ per milliliter and having an average particle size less than 4 nm and (ii) 0.1 to 50 weight percent of colloidal silica having an average particle size of at least 4 nm with a base to within a range of about pH 3 to pH 7 at a temperature within a range of about 25° C. to 250° C. to form a silica hydrogel having the colloidal silica incorporated therein and (B) mixing the silica hydrogel with (1) a catalytic amount of a strong acid and (2) an organosilicon compound selected from the group consisting of organosilanes described by formula

and organosiloxanes described by formula

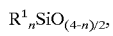

where each $R^1$ is independently selected from the group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive to form a hydrophobic silica hydrogel having a surface area within a range of about 100 m²/g to 450 m²/g as measured in the dry state.

2. A method according to claim 1, where the silica hydrosol comprises about 0.05 to 0.2 g of $SiO_2$ per milliliter.

3. A method according to claim 1, where the mixture comprises about 10 to 30 weight percent of colloidal silica, based on the total weight of the mixture.

4. A method according to claim 1, where the colloidal silica has a particle size within a range of about 6 to 100 nm.

5. A method according to claim 1, where the pH of the mixture is adjusted to within a range of about pH 3.5 to pH 6.

6. A method according to claim 1, where the temperature of the mixture during the pH adjusting of step (A) is within a range of about 75° C. to 150° C.

7. A method according to claim 1, where the temperature of the mixture during the pH adjusting of step (A) is within a range of about 90° C. to 110° C.

8. A method according to claim 1 further comprising aging the silica hydrogel of step (A) at a pH within a range of about pH 3.5 to pH 8 and a temperature within a range of about 0° C. to 250° C. for a period of time within a range of about 10 minutes to 76 hours prior to conducting of step (B).

9. A method according to claim 1 further comprising aging the silica hydrogel of step (A) at a pH within a range of about pH 6 to pH 7.5 and a temperature within a range of about 20° C. to 150° C. for a period of time within a range of about 1 to 24 hours prior to conduct of step (B).

10. A method according to claim 9, where the temperature at which the aging is effected is within a range of about 80° C. to 130° C.

11. A method according to claim 1 further comprising shearing the silica hydrogel of step (A) prior to conducting of step (B).

12. A method according to claim 1, where the mixing of step (B) is conducted at a temperature within a range of about 30° C. to 150° C.

13. A method according to claim 1, where the organosilicon compound is an organosiloxane.

14. A method according to claim 13, where the organosiloxane is hexamethyldisiloxane.

15. A method according to claim 1, where the organosilicon compound is an organosilane.

16. A method according to claim 15, where the organosilane is selected from the group consisting of vinyldimethylchlorosilane, vinylmethyldichlorosilane, dimethyldichlorosilane, hexenylmethyldichlorosilane, hexenyldimethylchlorosilane, and bis{3-(triethoxysilyl)propyl}tetrasulfide.

17. A method according to claim 1, where the organosilicon compound provides at least 0.04 organosilyl units per $SiO_2$ units of the silica hydrogel.

18. A method according to claim 1 further comprising contacting the hydrophobic silica hydrogel with a water-immiscible organic solvent in sufficient amount to convert the hydrophobic silica hydrogel to a hydrophobic silica organogel.

19. A method according to claim 1 further comprising during the mixing of step (B) the presence of a surfactant which facilitates reaction of the organosilicon compound with the silica hydrogel.

20. A method according to claim 1 further comprising during the mixing of step (B) the presence of a water-miscible solvent which facilitates reaction of the organosilicon compound with the silica hydrogel.

21. A method according to claim 1 further comprising mixing the silica hydrogel with an effective amount of a heat stabilizing agent selected from the group consisting of water soluble compounds of cerium and iron.

22. A method according to claim 21, where the water soluble compound is selected from the group consisting of $FeCl_3$ and $CeCl_3 \cdot 9H_2O$.

23. A composition prepared by the method of claim 1.

24. A composition prepared by the method of claim 11.

25. A composition prepared by the method of claim 18.

26. A composition prepared by the method of claim 21.

* * * * *